March 4, 1924.

W. A. TURBAYNE

WELDING GENERATOR

Filed Nov. 22, 1920

INVENTOR.
William A. Turbayne
BY Raymond H Van Vleet
ATTORNEYS.

March 4, 1924.

W. A. TURBAYNE

WELDING GENERATOR

Filed Nov. 22, 1920   3 Sheets-Sheet 2

1,485,744

INVENTOR.
William A. Turbayne
BY Raymond H. Van Vleet
ATTORNEYS.

March 4, 1924.  W. A. TURBAYNE  1,485,744

WELDING GENERATOR

Filed Nov. 22, 1920   3 Sheets-Sheet 3

INVENTOR.
William A. Turbayne
BY Raymond H Van Kest
ATTORNEYS.

Patented Mar. 4, 1924.

1,485,744

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

WELDING GENERATOR.

Application filed November 22, 1920. Serial No. 425,763.

*To all whom it may concern:*

Be it known that I, WILLIAM A. TURBAYNE, a citizen of the United States, residing at Niagara Falls, in the county of Niagara and State of New York, have invented new and useful Improvements in Welding Generators of which the following is a specification.

The present invention relates to welding generators.

By reason of an inherent property of the electric arc whereby increase of current therein is accompanied by decrease of resistance and consumed voltage, and vice versa, decrease of current is accompanied by increase of resistance and voltage, it is impossible to supply welding arcs directly from a source of constant potential. These inverse current and voltage variations are cumulative and any tendency for current to rise or vary, remains unchecked, so that current will build up and voltage will fall until a short circuit of the source results, or else current will fall and resistance increase until the arc will be ruptured through lack of available sustaining voltage.

To overcome this inherent instability, welding arcs must be connected in a circuit having a drooping volt-ampere characteristic, so that tendency for current to rise or fall will be immediately countered and checked by reduction or increase of voltage respectively.

With a constant potential source of supply it is usual practice to produce the drooping volt-ampere characteristic in each arc circuit by including therein a resistor, the voltage consumed by which will vary in proportion to current variations therethrough, the difference between the supply voltage and that consumed by the resistor being available for the arc. The value of the welding current is controlled by varying the amount of included resistance, either by manually operated switches or by automatic mechanisms responding to current variations in the welding circuit. To maintain a satisfactory, stable welding arc by this method, however, necessitates the employment of resistance of such value that the energy expended therein equals or exceeds that usually employed in the welding arc and the operating efficiency becomes intolerably low.

An object of the present invention is to provide a variable voltage generator which will inherently develop the desired voltage-current characteristic.

Further objects will appear as the description proceeds.

Referring to the drawings:—

Figure 1:
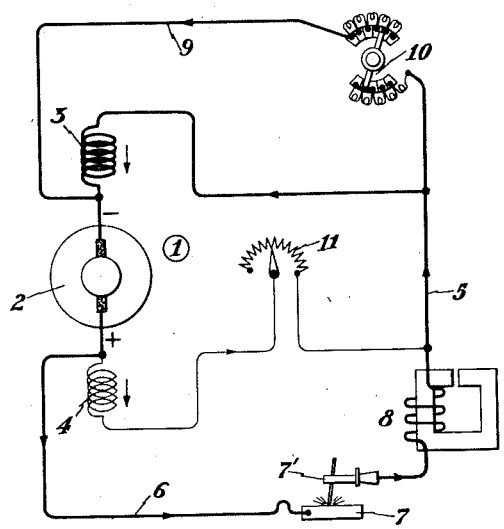
Figure 1 illustrates schematically a welding system employing a generator according to the present invention.

Referring first to Fig. 1, the numeral 1 indicates a welding generator having an armature 2. Said generator 1 is provided with series field windings 3 and shunt field windings 4, which should be wound to have cumulative effects under loaded conditions. The generator 1 is adapted to supply mains 5 and 6 in which may be located the material to be welded and the welding electrode, which are indicated by the numerals 7 and 7' respectively. Also located in the outside circuit of the generator 1 is a reactor 8, the functions of which are well known and need not be explained herein. As will be apparent hereafter, a very small reactor 8 may be used in the system according to the present invention, or said reactor may be dispensed with entirely. Arranged in parallel circuit with the series field winding 3 is an adjusting circuit 9 including the rheostat 10, by means of which the effect of the series field winding 3 may be varied as desired. The shunt field winding 4 has in circuit therewith an adjusting rheostat 11.

The generator is a self-exciting cumulative compound-wound machine and current regulation is effected by varying the voltage gradient on the commutator, the exciting field ampere turns, contributed by the series and shunt windings, remaining substantially constant throughout the complete range of operation varying from short circuit to open circuit conditions.

Shunt and series windings are applied to all of the field poles of the generator 1. The armature may have a standard two-path winding, preferably slightly chorded, and when loaded, the armature cross ampere turns should greatly exceed the total field ampere turns. In the diagrams shown in the drawings, the brushes have been placed as they would be in the case of symmetrically arranged end connectors for the armature conductors. The armature is provided with a comparatively large number of conductors.

Figure 2:
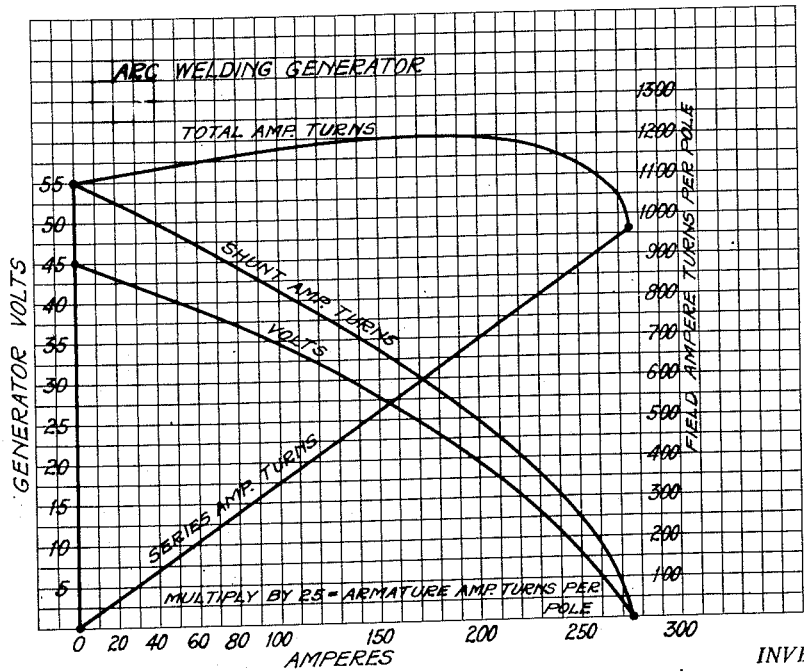
Fig. 2 is a diagram illustrating circuit characteristics of the generator according to the present invention.

Figure 2 shows the values taken from practice indicating the ampere turns of the different windings on a machine set to deliver 200 amperes with 20 volts at the terminals. Under the conditions chosen for illustration, the open circuit setting was 45 volts and short circuit current was 275 amperes. At the welding point, that is, 200 amperes, the field exciting force is 1200 ampere turns per pole, 700 being contributed by the series winding and 500 by the shunt winding. The cross magnetizing force of the armature with this current is 5000 ampere turns per pole, or over four times that of the field exciting force. It should be noted that the total ampere turns are substantially constant, particularly in the welding range in the neighborhood of 200 amperes at 20 volts.

Figure 3:
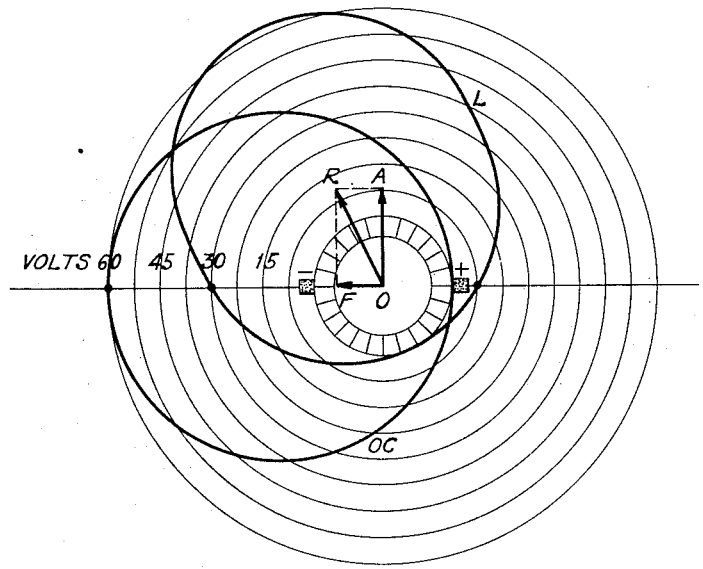
Fig. 3 is a polar diagram illustrating the manner in which regulation is accomplished.

Fig. 3 illustrates the manner in which inherent regulation is produced by shifting the line of maximum potential difference around the commutator and away from the collecting brushes in response to current increase through the armature, and vice versa. The line O—F indicates the field flux developed by the field windings and producing an open circuit voltage distribution around the commutator, represented by the curve O—C, with points of maximum potential difference, in line with the brushes, indicated as 60 volts. Upon closing the welding circuit, current in the armature will produce a cross flux O—A. O—F and O—A combine to form O—R, the resultant flux. As O—F remains substantially constant, and O—A varies in proportion to the line current, increase of current will shift O—R and consequently the points of maximum voltage difference on the commutator, in a clock-wise direction, as indicated by the curve L, and the voltage effective on the brushes will fall off. On the other hand, decrease of current will reduce O—A, shift O—R in a counter clock-wise direction and consequently, the voltage effective on the brushes will rise.

Figure 4:
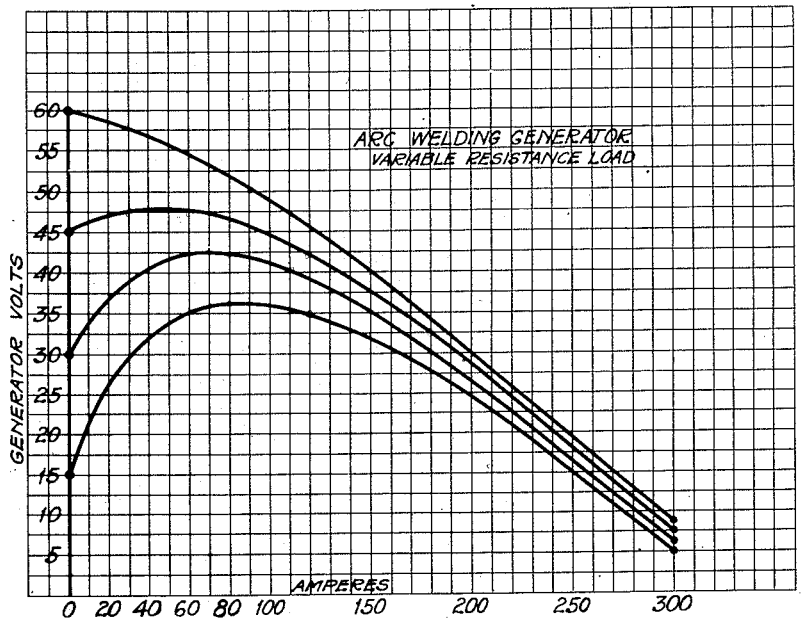
Fig. 4 is a diagram illustrating four volt-ampere curves taken with different open circuit voltage settings.

Reference may now be made to Fig. 4, which shows four volt-ampere curves taken with a different open circuit voltage setting, obtained by adjustment of the shunt field current. At 60 volts, the iron being worked well up on the saturation curve, the generator voltage immediately falls, upon the application of load, and continues to fall as the load current is increased. With lower open circuit settings, however, the voltage first rises, due to the effect of the series winding, and the lower the open circuit voltage, the more pronounced is the initial series characteristic and the greater becomes the current value required to finally produce a falling voltage. Around the welding point, however, approximately 20 volts, the curves closely approach and not more than 25 amperes difference exists between the 60 volt open circuit curve and the one having the 15 volt setting. These curves show that a definite open circuit voltage adjustment is a matter of little consequence and that the main function of the shunt field winding is to support the excitation and maintain voltage on the machine.

Figure 5:
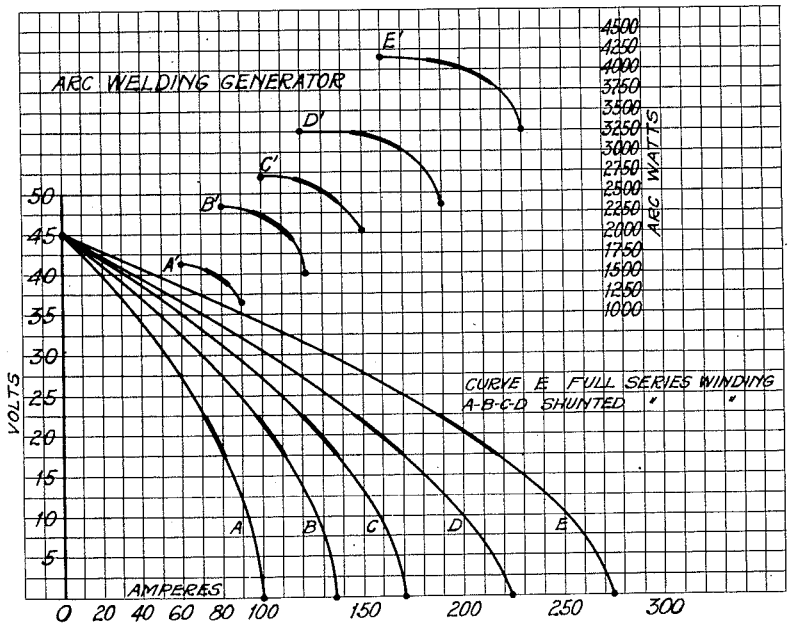
Fig. 5 is a diagram illustrating how the current values in the welding circuit may be adjusted.

Fig. 5 illustrates how the current values in the welding circuit may be adjusted by connecting shunting resistances of different values across series field winding 3 by means of the rheostat 10, illustrated in Fig. 1. Curve E illustrates conditions taken from practice with the full series winding effective, while curves A, B, C and D represent conditions with a shunted series field winding. The heavy portions of the curves A, B, C, D and E indicate a zone bounded by voltage values at 17—5/10 to 22—5/10 within which a competent welding operator should be able to confine his operations. Corresponding portions of the curves A', B', C', D', and E' illustrate the variations in arc watts resulting from variations of voltage within this operating zone.

Decided variations in the welding characteristic of the generator 1 may be produced by varying the position of the brushes on the commutator. This shifting of the brushes alters the inclination of the armature cross flux axis O—A, Fig. 3, and on account of the powerful magnetizing force imparted by the armature, a slight shift of this axis O—A one way or another will not only result in shifting the resultant flux axis O—R, but will also introduce a component which will combine with the field flux axis O—F either additively or subtractively. The slope of the characteristic effective on the welding zone may be so chosen that the current may be caused to be varied in the desired inverse proportion to voltage changes, so as to maintain the arc watts constant, or the current may be held substantially constant, resulting in considerable variation in arc watts. A competent operator, however, maintaining a sufficiently close arc, will automatically maintain the energy liberated at the arc reasonably constant.

Figure 6:
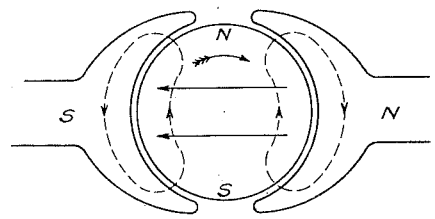
Fig. 6 illustrates pole tips which may be used.

The advantages produced by the present invention result from various causes, one of which is the designing of the cumulative compound winding, whereby to maintain a substantially constant field excitation. Furthermore, the large number of armature conductors materially increase the reactance of the machine on account of the short magnetic circuit around the field pole pieces. The effective reactance may be increased by broadening the pole span as illustrated in Fig. 6.

Regulation is obtained by flux distortion in the inter-polar space surrounding the armature, under immediate response to the armature current variations and as the flux in the poles and field ring remains substantially undisturbed, no damping action results from current circulating in the field winding or solid mass of iron in the magnet structure. Therefore, a pronounced freedom from lag exists during the welding operation. Furthermore, upon breaking the arc, the inductive or transformer action, due to the mutual relationship of cumulative series and shunt windings of the poles, develops an E. M. F. in the shunt windings which causes a current to flow in the correct direction to build up the generator voltage. In this respect the generator differs from a differential machine in which current circulating in the field windings during flux changes, oppose such changes and produce a damping action.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. A welding generator having a shunt field winding and a cumulative series winding, said field windings being designed to maintain the sum of the ampere turns thereof substantially constant regardless of changes in current output and throughout voltage variations from a maximum open circuit condition to substantially short circuit condition.

2. A generator having a shunt field winding and a cumulative series winding designed to maintain the sum of the ampere turns thereof substantially constant regardless of changes in current output, and an armature winding producing, when loaded, a number of cross ampere turns greatly exceeding said field ampere turns.

3. A generator having field windings, said field windings being designed to maintain the sum of the ampere turns thereof substantially constant, regardless of changes in current output and an armature winding producing, when loaded, a number of cross ampere turns greatly exceeding the ampere turns of said field windings.

4. A welding generator having cumulative series windings and shunt windings wound on the same pole pieces, said windings being designed to produce a nearly constant number of ampere turns regardless of changes in current output and throughout voltage variations from a maximum open circuit condition to substantially short circuit condition.

5. A generator having cumulative series windings and shunt windings wound on the same pole pieces, said windings being designed to produce a nearly constant number of ampere turns, the armature of said generator being designed to have, when loaded, a materially greater number of ampere turns than said windings.

6. A generator having cumulative series windings and shunt windings wound on the same pole pieces, said windings being designed to produce a nearly constant number of ampere turns, the armature of said generator being designed to have, when loaded, a materially greater number of ampere turns than said windings, said pole piece having a relatively wide span to increase the reactance of said armature.

7. A self-exciting dynamo-electric machine provided with cumulative series and shunt windings producing a falling voltage at its terminals with increase in current output, said series windings being so proportioned that the increase in current therein compensates throughout a range from maximum open circuit condition to substantially short circuit condition for the reduction of current in said shunt windings, thereby maintaining the total effective exciting ampere turns substantially constant.

8. A self-exciting dynamo-electric machine provided with cumulative series and shunt windings producing a falling voltage at its terminals with increase in current output, said series windings being so proportioned that the increase in current therein compensates for the reduction of current in said shunt windings, thereby maintaining the total effective exciting ampere turns substantially constant, said machine having an armature designed to have, when loaded, a materially greater number of ampere turns than said windings.

9. A welding generator having field windings, said field windings being designed to maintain the sum of the ampere turns thereof substantially constant, regardless of changes in current output, and throughout voltage fluctuations from a maximum open circuit condition to substantially short circuit condition.

In witness whereof, I have hereunto subscribed my name.

WILLIAM A. TURBAYNE.